(12) United States Patent
Koga

(10) Patent No.: US 9,662,718 B2
(45) Date of Patent: May 30, 2017

(54) DRILL AND METHOD FOR MANUFACTURING CUT WORKPIECES USING SAME

(71) Applicant: KYOCERA Corporation, Kyoto-shi, Kyoto (JP)

(72) Inventor: Kenichirou Koga, Yasu (JP)

(73) Assignee: KYOCERA CORPORATION, Kyoto-shi (JP)

( * ) Notice: Subject to any disclaimer, the term of this patent is extended or adjusted under 35 U.S.C. 154(b) by 100 days.

(21) Appl. No.: 14/431,308

(22) PCT Filed: Sep. 18, 2013

(86) PCT No.: PCT/JP2013/075166
§ 371 (c)(1),
(2) Date: Mar. 26, 2015

(87) PCT Pub. No.: WO2014/050661
PCT Pub. Date: Apr. 3, 2014

(65) Prior Publication Data
US 2015/0266108 A1   Sep. 24, 2015

(30) Foreign Application Priority Data

Sep. 28, 2012  (JP) .................................. 2012-217864

(51) Int. Cl.
*B23B 51/02* (2006.01)

(52) U.S. Cl.
CPC ........ *B23B 51/02* (2013.01); *B23B 2251/085* (2013.01); *B23B 2251/14* (2013.01);
(Continued)

(58) Field of Classification Search
CPC .............. B23B 51/02; B23B 2226/125; B23B 2226/31; B23B 2240/08; B23B 2251/46;
(Continued)

(56) References Cited

U.S. PATENT DOCUMENTS

| 305,625 | A | * | 9/1884 | Newey, Jr. | ............ | B23B 51/108 |
| | | | | | | 408/224 |
| 2,259,611 | A | * | 10/1941 | Burger | ................... | B23B 51/02 |
| | | | | | | 403/19 |

(Continued)

FOREIGN PATENT DOCUMENTS

| CH | 693228 A5 * | 4/2003 | ............. B23B 51/02 |
| DE | 102004047469 A1 | 4/2006 | |

(Continued)

OTHER PUBLICATIONS

CH 693 228 Machine Translation, pp. 3-4, Aug. 22, 2016.*

(Continued)

*Primary Examiner* — Sunil K Singh
*Assistant Examiner* — Nicole N Ramos
(74) *Attorney, Agent, or Firm* — Viering, Jentschura & Partner mbB

(57) ABSTRACT

A drill includes a cutting section having a cylindrical shape and configured to be rotated about a rotation axis. The cutting section includes a first cutting section and a second cutting section, at a front end portion thereof, a first flute continuous with the first cutting section and extending helically around the rotation axis toward a rear end of the cutting section, and a second flute continuous with the second cutting section and extending helically around the rotation axis toward the rear end of the cutting section. The first cutting section includes a first inner cutting edge and a first outer cutting edge positioned closer to the outer peripheral surface than the first inner cutting edge and gradually inclined to the rear end of the cutting section toward the outer peripheral surface. The first inner cutting edge is positioned closer to the rear end of the cutting section than the inner end of the first outer cutting edge.

14 Claims, 5 Drawing Sheets

(52) U.S. Cl.
CPC ......... *B23B 2251/46* (2013.01); *Y10T 408/03* (2015.01); *Y10T 408/899* (2015.01); *Y10T 408/905* (2015.01)

(58) Field of Classification Search
CPC ............ B23B 2251/18; B23B 2251/50; B23B 2251/125; B23B 2251/14; Y10T 408/895; Y10T 408/896; Y10T 408/899; Y10T 408/90467; Y10T 408/905; Y10T 408/906; Y10T 408/909; Y10T 408/9093; Y10T 408/9095; Y10T 408/9097
See application file for complete search history.

(56) References Cited

U.S. PATENT DOCUMENTS

| | | | | |
|---|---|---|---|---|
| 2,334,089 | A * | 11/1943 | Hallden | ............... B23B 51/02 408/211 |
| 2,898,786 | A * | 8/1959 | Willingham | ........ B23B 51/0486 408/211 |
| 3,452,625 | A * | 7/1969 | Russo | .................. B23B 51/02 408/223 |
| 4,143,723 | A * | 3/1979 | Schmotzer | ............. B23B 51/02 175/394 |
| 4,645,389 | A | 2/1987 | Maier | |
| 4,671,710 | A * | 6/1987 | Araki | .................... B23B 51/02 408/145 |
| 6,267,542 | B1 * | 7/2001 | Salmon | .................. B23B 51/02 408/223 |
| 6,821,061 | B2 * | 11/2004 | Frejd | ..................... B23B 51/02 408/211 |
| 8,449,227 | B2 | 5/2013 | Danielsson | |
| 2004/0018064 | A1 * | 1/2004 | Liu | ........................ B23B 27/00 408/224 |
| 2004/0065483 | A1 | 4/2004 | Sollami | |
| 2007/0169965 | A1 | 7/2007 | Moser et al. | |
| 2009/0279965 | A1 * | 11/2009 | Soittu | .................... B23B 51/02 408/59 |

FOREIGN PATENT DOCUMENTS

| | | | | |
|---|---|---|---|---|
| GB | 832238 | A * | 4/1960 | ............. B23B 51/02 |
| JP | 57100414 | U | 6/1982 | |
| JP | 5981010 | A | 5/1984 | |
| JP | WO 9203243 | A1 * | 3/1992 | ......... B23B 27/1629 |
| JP | 929525 | A | 2/1997 | |
| JP | 20115632 | A | 1/2011 | |

OTHER PUBLICATIONS

European Search Report issued in the corresponding European patent application No. 13 842 583.0 dated May 3, 2016, 9 pages.
International Search Report issued for PCT/JP2013/075166 on Oct. 15, 2013.

* cited by examiner

DRILL AND METHOD FOR MANUFACTURING CUT WORKPIECES USING SAME

RELATED APPLICATIONS

The present application is a national stage entry according to 35 U.S.C. §371 of PCT application No. PCT/JP2013/075166 filed on Sep. 18, 2013, which claims priority from Japanese application No. 2012-217864 filed on Sep. 28, 2012, and is incorporated herein by reference in its entirety.

TECHNICAL FIELD

The present invention relates to a drill and a method for manufacturing cut workpieces using the same.

BACKGROUND ART

As a cutting insert used for a cutting process performed on a work material, which will be a cut workpiece, a drill described in Japanese Unexamined Patent Application Publication No. 9-029525 (Patent Literature 1) is known. Patent Literature 1 describes a drill having a concave arc-like shape, in a side view, at a front end portion of the body. The drill includes a cutting edge at the arc-like shaped portion.

However, when a cutting process is performed by using the drill having such a configuration, the drill starts to cut into a workpiece, which is an object to be cut, from an outermost periphery of the cutting edge. Thus, the end of the cutting edge comes into contact with the workpiece at a sharp angle. Therefore, the end of the cutting edge may easily chip when the cutting speed is high. During drilling, problems such as chatter vibration or drill deflection may occur. This makes it difficult to improve roundness and positional accuracy of a drilled hole.

In view of the above, it has been desired to have a drill that enables a drilled hole to have a higher positional accuracy and to have a smoother inner wall even when a cutting speed is high.

SUMMARY OF INVENTION

A drill according to an embodiment of the present invention includes a cutting section having a cylindrical shape and configured to be rotated about a rotation axis. The cutting section includes a first cutting section and a second cutting section, at a front end portion thereof, a first flute continuous with the first cutting section and extending helically around the rotation axis toward a rear end of the cutting section, and a second flute continuous with the second cutting section and extending helically around the rotation axis toward the rear end of the cutting section.

The first cutting section includes a first inner cutting edge extending from the rotation axis toward an outer peripheral surface and a first outer cutting edge positioned closer to the outer peripheral surface than the first inner cutting edge and gradually inclined to the rear end of the cutting section toward the outer peripheral surface. The second cutting section includes a second inner cutting edge extending from the rotation axis toward the outer peripheral surface and a second outer cutting edge positioned closer to the outer peripheral surface than the second inner cutting edge and gradually inclined to the rear end of the cutting section toward the outer peripheral surface.

A distance from the rear end of the cutting section to an inner end of the first outer cutting edge in a rotation axis direction is equal to a distance from the rear end of the cutting section to an inner end of the second outer cutting edge. The first inner cutting edge is positioned closer to the rear end of the cutting section than the inner end of the first outer cutting edge, and the second inner cutting edge is positioned closer to the rear end of the cutting section than the inner end of the second outer cutting edge.

BRIEF DESCRIPTION OF DRAWINGS

FIG. 1A is a side view. FIG. 1B is a perspective view. FIG. 1C is a front end view (front view) illustrating the drill from a front end side.

FIG. 5A is a schematic view illustrating a step in the method. FIG. 5B is a schematic view illustrating a step in the method. FIG. 5C is a schematic view illustrating a step in the method.

DESCRIPTION OF EMBODIMENTS

<Drill>

Hereinafter, a drill 1 according to an embodiment of the present invention will be described in detail with reference to FIG. 1 to FIG. 4.

Figure 1A:
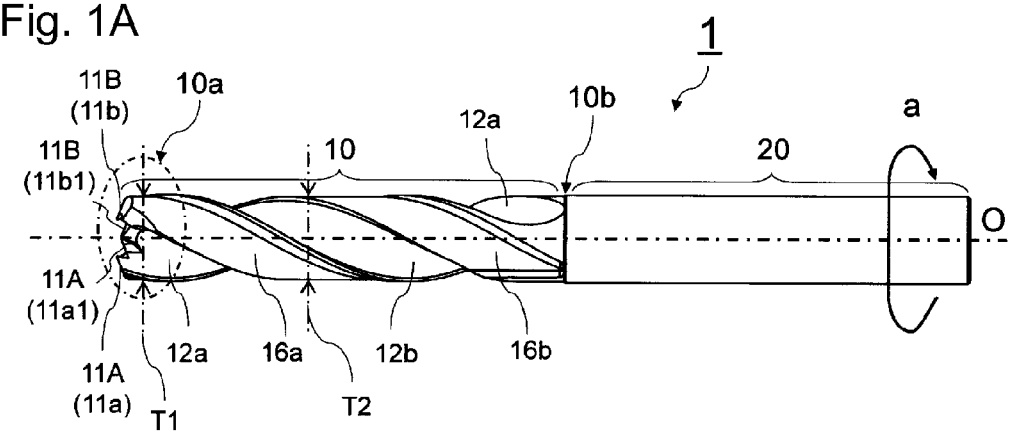
FIGS. 1A to 1C are views illustrating a drill according to an embodiment of the present invention.

As illustrated in FIG. 1A, the drill 1 of this embodiment includes a body 20, which is held by a spindle, for example, of a machine (not illustrated), and a cutting section 10 on one end side (front end side) of the body 20. Although the spindle is not illustrated in FIG. 1, the spindle is one component of the machine and rotates while holding the drill. The rotation of the spindle rotates the drill 1 about a rotation axis O. The body 20 is a portion that is designed in accordance with the shape of the rotation shaft of the machine. The cutting section 10 is a portion to be in contact with a work material. An arrow "a" indicates a rotational direction of the drill 1.

Figure 1B:
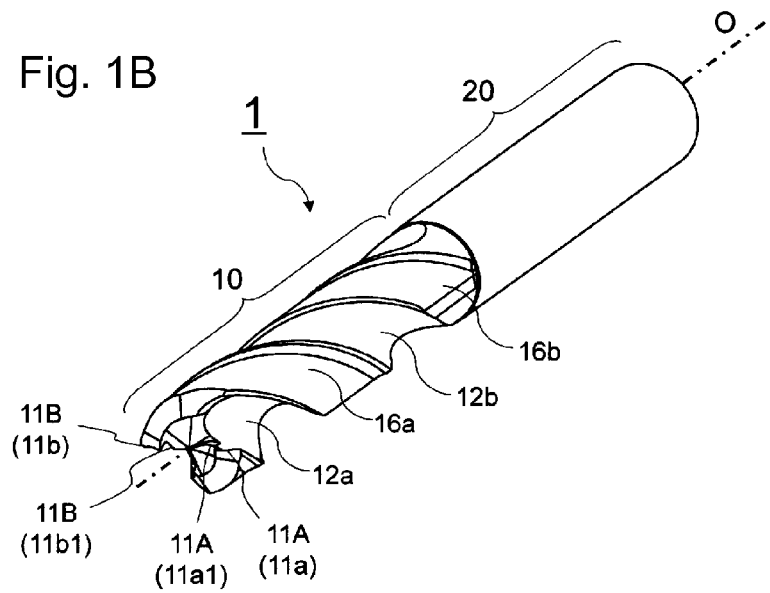
Figure 1C:
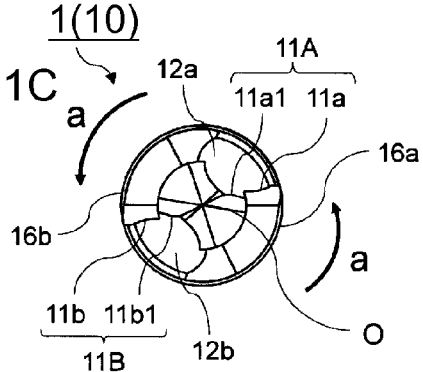
Figure 2:
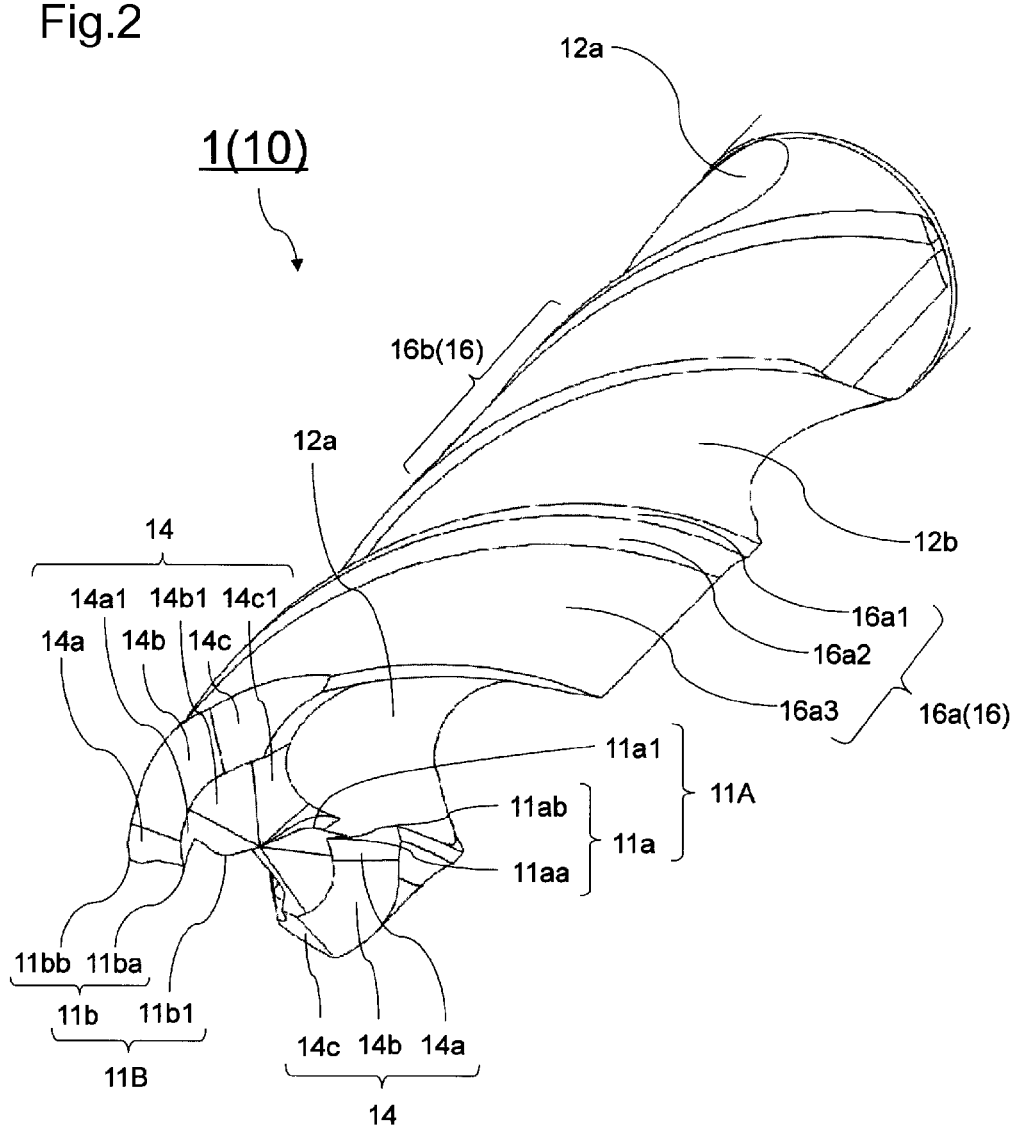
FIG. 2 is a partial perspective view illustrating a magnified cutting section of the drill in FIG. 1.
Figure 3:
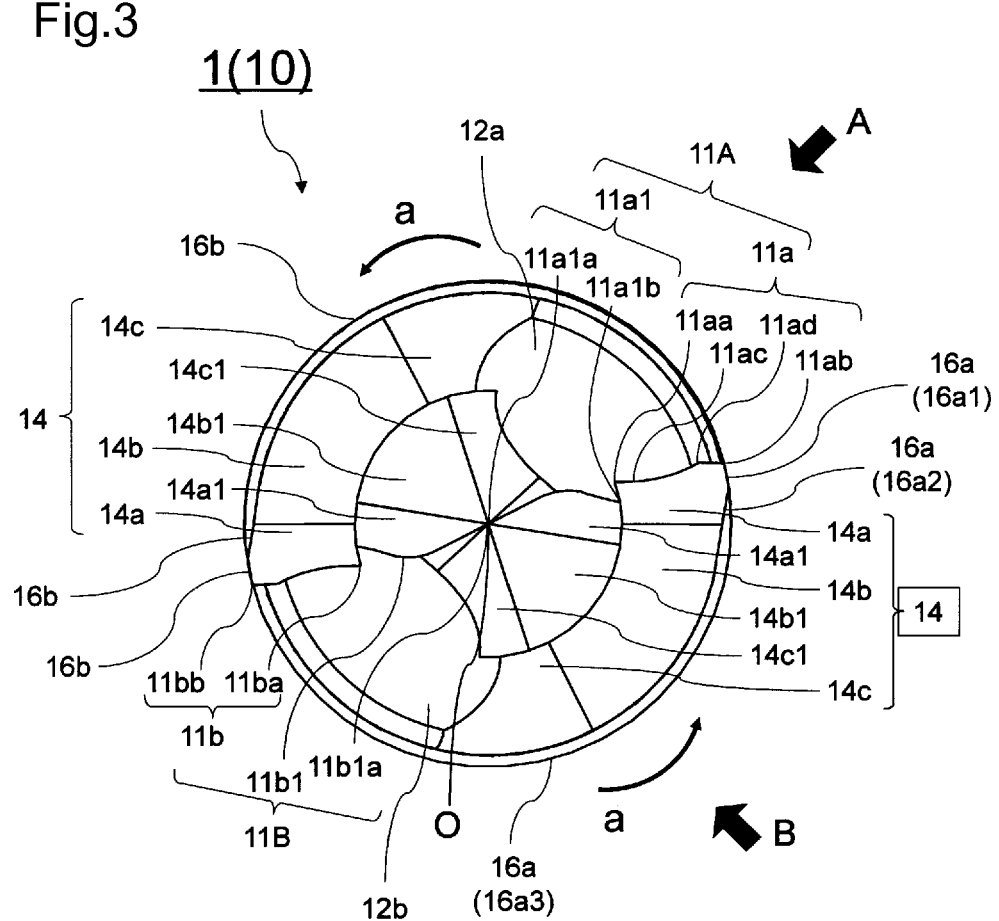
FIG. 3 is a front end view (front view) illustrating the drill, which is illustrated in FIG. 1, from the front end side.

As illustrated in FIG. 1B and FIG. 1C, the cutting section 10 is a crucial part for the cutting process of the work material. The cutting section 10 has a cylindrical shape and rotates about the rotation axis O. As illustrated in FIG. 2 and FIG. 3, for example, a front end portion 10a of the cutting section 10 includes a first cutting section 11A and a second cutting section 11B.

In this embodiment, as illustrated in FIG. 1C and FIG. 3, the first cutting section 11A and the second cutting section 11B are rotationally symmetrical about the rotation axis O in a front end view. Due to this configuration, wobbling is unlikely to occur when the drill 1 bites into the work material. As a result, the drill 1 can perform stable drilling. Specifically, in a front end view, the first cutting section 11A and the second cutting section 11B are point-symmetrical with respect to the rotation axis O of the cutting section 10.

The first cutting section 11A includes a first inner cutting edge 11a1 and a first outer cutting edge 11a. The first inner cutting edge 11a1 extends from the rotation axis O toward the outer peripheral surface. In the drill 1 of this embodiment, the first inner cutting edge 11a1 acts as a first chisel edge 11a1. As illustrated in FIG. 1A, the first outer cutting edge 11a is positioned closer to the outer peripheral surface than the first inner cutting edge 11a1 and is gradually inclined to a rear end 10b of the cutting section 10 toward the outer peripheral surface.

The second cutting section 11B includes a second inner cutting edge 11b1 and a second outer cutting edge 11b. The second inner cutting edge 11b1 extends from the rotation axis O toward the outer peripheral surface. In the drill 1 of this embodiment, the second inner cutting edge 11b1 acts as a second chisel edge 11b1. As illustrated in FIG. 1A, the second outer cutting edge 11b is positioned closer to the outer peripheral surface than the second inner cutting edge 11b1 and is gradually inclined to the rear end 10b of the cutting section 10 toward the outer peripheral surface.

Figure 4A:
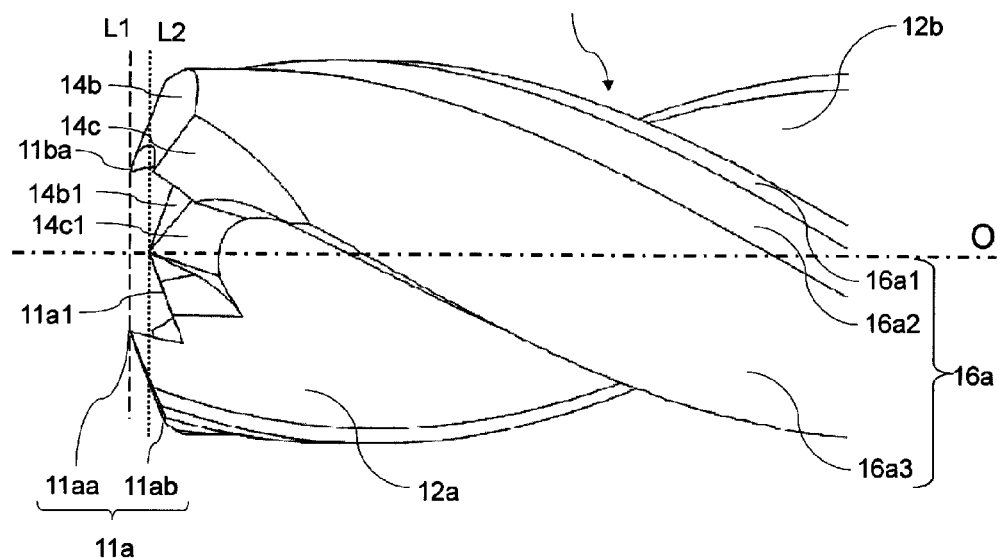
FIG. 4A is a side view of the drill viewed in a direction indicated by an arrow A in FIG. 3.
Figure 4B:
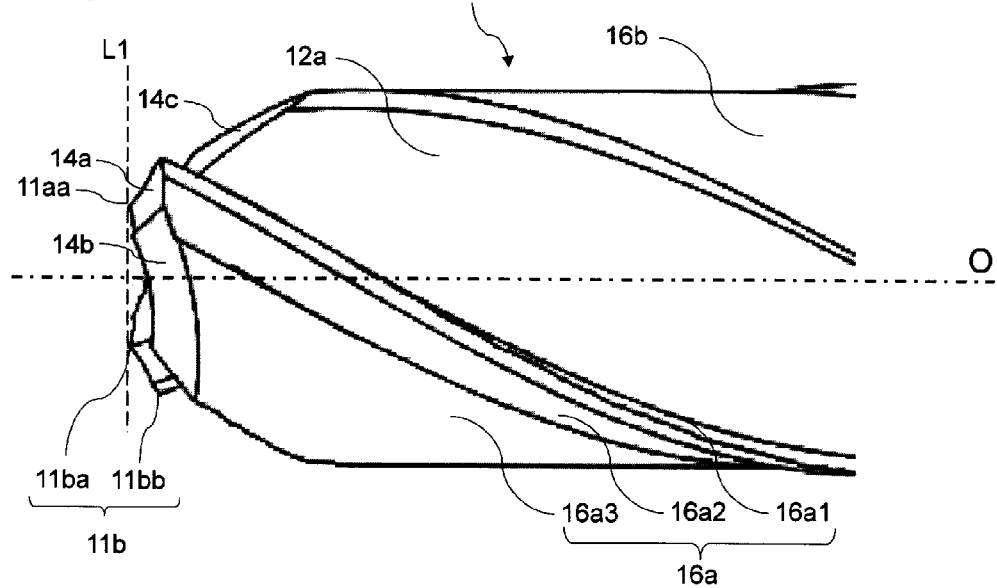
FIG. 4B is a side view of the drill viewed in a direction indicated by an arrow B in FIG. 3.

Since the first outer cutting edge 11a and the second outer cutting edge 11b are inclined as stated above, as illustrated in FIG. 4, inner ends 11aa, 11ba of the first outer cutting edge 11a and the second outer cutting edge 11b come into contact with the work material before outer ends 11ab, 11bb of the first outer cutting edge 11a and the second outer cutting edge 11b.

In addition, in this embodiment, a distance from the rear end of the cutting section 10 to the inner end 11aa of the first outer cutting edge 11a in the direction along the rotation axis O is equal to a distance from the rear end of the cutting section 10 to the inner end 11ba of the second outer cutting edge 11b. In other words, as illustrated in FIG. 4, the inner end 11aa of the first outer cutting edge 11a and the inner end 11ba of the second outer cutting edge 11b are both positioned on an imaginary line L1 that is perpendicular to the rotation axis O. With this configuration, the inner end 11aa of the first outer cutting edge 11a and the inner end 11ba of the second outer cutting edge 11b come into contact with the work material at the same time.

In the above-described configuration, the rigidity of the cutting section 10 is improved compared with the case in which the cutting edge comes into contact with the work material at the entire outer end. Thus, high chipping resistance is exhibited even when a cutting speed is high.

In the drill 1 of this embodiment, two outer cutting edges (first outer cutting edge 11a and second outer cutting edge 11b) are positioned away from each other with the first chisel edge 11a1 and the second chisel edge 11b1, which are the first inner cutting edge 11a1 and the second inner cutting edge 11b1, being positioned therebetween.

An exterior end (outer periphery) of the cutting section 10 includes two flutes (first flute 12a and second flute 12b) corresponding to the two outer cutting edges. The first flute 12a is continuous with the first cutting section 11A and extends helically around the rotation axis O from the front end portion 10a toward the rear end 10b of the cutting section 10. The second flute 12b is continuous with the second cutting section 11B and extends helically around the rotation axis O from the front end portion 10a toward the rear end 10b of the cutting section 10.

As illustrated in FIG. 1, for example, in this embodiment, the cutting section 10 has a cylindrical shape. Specifically, in a cross section of the cutting section 10 taken perpendicular to the rotation axis O, an equation T1=T2 in which T1 is a diameter of the front end portion 10a and T2 is a diameter of a portion other than the front end portion 10a is satisfied. In the cross section of the cutting section 10, which is taken perpendicular to the rotation axis O, the cutting section 10 has a constant diameter from the front end portion 10a to the rear end 10b.

In this specification, the rotation axis O is a line passing through the center of the cutting section 10 in a front end view. In this embodiment, the rotation axis O passes through a point where the first chisel edge 11a1 and the second chisel edge 11b1 meet. In this specification, the term "in a front end view" denotes that the drill 1 is viewed from a side of the front end portion 10a.

As illustrated in FIG. 1A, the two chisel edges (first chisel edge 11a1, second chisel edge 11b1) are included in the front end portion 10a of the cutting section 10. In this embodiment, the first chisel edge 11a1 and the second chisel edge 11b1 cut the work material together with the first outer cutting edge 11a and the second outer cutting edge 11b. The first chisel edge 11a1 and the second chisel edge 11b1 are smoothly connected to each other at the rotation axis O. As illustrated in FIG. 1C and FIG. 3, the first chisel edge 11a1 and the second chisel edge 11b1 are 180° rotationally symmetrical about the rotation axis O (axial line) of the cutting section 10.

The term "the first chisel edge 11a1 and the second chisel edge 11b1 are smoothly connected to each other" denotes a state in which an inner end 11a1a of the first chisel edge 11a1 and an inner end 11b1a of the second chisel edge 11b1 share the tangent line in a front end view of the fire chisel edge 11a1 and the second chisel edge 11b1.

In this embodiment, the first chisel edge 11a1 and the second chisel edge 11b1 are curved in a front end view. Specifically, as illustrated in FIG. 3, for example, the first chisel edge 11a1 is a convex curved line protruding toward the first flute 12a in a front end view. The second chisel edge 11b1 is a convex curved line protruding toward the second flute 12b in a front end view. This configuration enhances the strength of the first chisel edge 11a1 and the second chisel edge 11b1, and thus chipping of the chisel edges during the cutting process is reduced.

The first inner cutting edge 11a1 (first chisel edge 11a1) is positioned closer to the rear end 10b of the cutting section 10 than the inner end 11aa of the first outer cutting edge 11a. The second inner cutting edge 11b1 (second chisel edge 11b1) is positioned closer to the rear end 10b of the cutting section 10 than the inner end 11ba of the second outer cutting edge 11b. In other words, the inner ends 11aa, 11ba of the two outer cutting edges (first outer cutting edge 11a, second outer cutting edge 11b) protrude farthest in a direction along the front end of the cutting section 10. In this specification, the term "protrude farthest in the direction along the front end of the cutting section 10" denotes a state in which a distance from the rear end 10b of the cutting section 10 in the direction along the rotation axis O is the maximum.

As illustrated in FIG. 4, an imaginary line L2 perpendicular to the rotation axis O and in contact with the inner end 11a1a of the first inner cutting edge 11a1 and the inner end 11b1a of the second inner cutting edge 11b1 is positioned closer to the rear end of the cutting section 10 (on the right side in FIG. 4) than the imaginary line L1, which is in contact with the inner end 11aa of the first outer cutting edge 11a and the inner end 11ba of the second outer cutting edge 11b.

Since the first cutting section 11A and the second cutting section 11B have the above configuration, the inner end 11aa of the first outer cutting edge 11a and the inner end 11ba of the second outer cutting edge 11b come into contact with the work material before the first inner cutting edge 11a1 and the second inner cutting edge 11b1. Thus, burr is unlikely to occur in an inner wall of a drilled hole compared with a case in which the center of the entire cutting edge is the first to come into contact with the work material.

In this embodiment, as illustrated in FIG. 1C and FIG. 3, the first outer cutting edge 11a and the second outer cutting edge 11b are 180° rotationally symmetrical about the rotation axis O (axial line) of the cutting section 10. The first outer cutting edge 11a of this embodiment, in the front end view of FIG. 3, includes a concave portion 11ac recessed from the first flute 12a and a convex portion had protruding toward the first flute 12a. The convex portion had is positioned closer to the outer periphery than the concave portion 11ac.

The concave portion 11ac enables chips to be readily curled, which improves chip removal. The convex portion had enhances the strength of the cutting edge at a part receiving a large cutting force. The concave portion 11ac and the convex portion had are distinguished by the side in the rotational direction to which they protrude from a straight line connecting the inner end 11aa and the outer end 11ab of the first outer cutting edge 11a.

In the first outer cutting edge 11a of this embodiment, the concave portion 11ac is positioned closer to the inner end 11aa and the convex portion had is positioned closer to the outer end 11ab. If the concave portion 11ac and the convex portion had form one continuous curved line, the strength of the first outer cutting edge 11a is further enhanced. In this specification, the term "inner end" denotes an end portion, of a predetermined component, on a side closer to the rotation axis (center axis) 0 in a front end view. The term "outer end" denotes an end portion on a side far from the rotation axis O.

In this embodiment, as illustrated in FIG. 3, the outer end 11a1b of the first chisel edge 11a1 is positioned behind the inner end 11aa of the first outer cutting edge 11a in the rotational direction in a front end view. In addition, in this embodiment, as illustrated in FIG. 2, the first chisel edge 11a1 is not continuous with the first outer cutting edge 11a. In other words, the first chisel edge 11a1 is away from the first outer cutting edge 11a.

Specifically, as illustrated in FIG. 3, the first chisel edge 11a1 is not continuous with the first outer cutting edge 11a in a front end view. Furthermore, as illustrated in FIG. 4, the first chisel edge 11a1 is not continuous with the first outer cutting edge 11a in a side view either. With this configuration, the first chisel edge 11a1 and the first outer cutting edge 11a start to bite into the work material at different times. Thus, a high chip-separation property is exhibited, and consistent chip ejection is achieved.

As illustrated in FIG. 2 to FIG. 4, the cutting section 10 includes flank surfaces 14, which are continuous with a corresponding one of the first cutting section 11A and the second cutting section 11B. The flank surfaces 14 each include a first flank surface 14a, which is continuous with the first outer cutting edge 11a or the second outer cutting edge 11b, and a second flank surface 14b, which is continuous with the first flank surface 14a, and a third flank surface 14c, which is continuous with the second flank surface 14b.

The first flank surface 14a is inclined at 5 to 15°, for example, toward the rear end 10b with respect to the first outer cutting edge 11a or the second outer cutting edge 11b. The second flank surface 14b is inclined at 5 to 40°, for example, toward the rear end 10b with respect to the first flank surface 14a. The third flank surface 14c is inclined at 5 to 40° toward the rear end 10b with respect to the second flank surface 14b.

The flank surfaces 14 each further include a fourth flank surface 14a1, which is continuous with the first chisel edge 11a1 or the second chisel edge 11b1, a fifth flank surface 14b1, which is continuous with the fourth flank surface 14a1, and a sixth flank surface 14c1, which is continuous with the fifth flank surface 14b1.

The fourth flank surface 14a1 is inclined at 5 to 15°, for example, toward the rear end 10b with respect to the first chisel edge 11a1 or the second chisel edge 11b1. The fifth flank surface 14b1 is inclined at 5 to 40°, for example, toward the rear end 10b with respect to the fourth flank surface 14a1. The sixth flank surface 14c1 is inclined at 5 to 40°, for example, toward the rear end 10b with respect to the fifth flank surface 14b1.

This embodiment includes the fourth flank surface 14a1 to the sixth flank surface 14c1 with respect to the first chisel edge 11a1. With this configuration, the flank surfaces 14a1 to 14c1 of the first chisel edge 11a1 are unlikely to be in contact with the work material. Thus, not only the cutting resistance, but also the damage to the first chisel edge 11a1 is reduced.

In this embodiment, as illustrated in FIG. 4A, in the first cutting section 11A, the inner end 11aa of the first outer cutting edge 11a in a front end view protrudes farthest in a direction of the front end of the cutting section 10 in a side view.

Furthermore, as illustrated in FIG. 4A, in the first cutting section 11A, the inner end 11a1a of the first chisel edge 11a1 in a front end view and the outer end 11ab of the first outer cutting edge 11a in a front end view are located at different front-rear positions in a side view. If both ends come into contact with the work material at the same time, higher cutting resistance will result. In such a case, the outer end 11ab of the first outer cutting edge 11a can chip due to the vibration resulting from the increased cutting resistance. However, the above-described configuration reduces the possibility that the outer end 11ab of the first outer cutting edge 11a will chip. In the first cutting section 11A, the outer end 11ab of the first outer cutting edge 11a in a front end view only has to be positioned closer to the rear end 10b in a side view than the inner end 11a1a of the first chisel edge 11a1 in a front end view, for example.

The two flutes (first flute 12a, second flute 12b) are configured mainly to eject chips produced by two outer cutting edges (first outer cutting edge 11a, second outer cutting edge 11b). As illustrated in FIG. 1 and FIG. 2, the first flute 12a and the second flute 12b are continuous with the first outer cutting edge 11a and the second outer cutting edge 11b, respectively. Furthermore, the first flute 12a and the second flute 12b extend helically around the rotation axis O from the front end portion 10a of the cutting section 10 toward the rear end 10b.

During the cutting process, chips produced by the first outer cutting edge 11a are ejected to the side of the rear end 10b through the first flute 12a, which is continuous with the first outer cutting edge 11a. Chips produced by the second outer cutting edge 11b are ejected to the side of the rear end 10b through the second flute 12b, which is continuous with the second outer cutting edge 11b.

In this embodiment, the helix angle of the first flute 12a and the helix angle of the second flute 12b are the same. Furthermore, chips produced by the first inner cutting edge 11a1 and the second inner cutting edge 11b1 are ejected to the side of the rear end 10b through a corresponding one of the first flute 12a and the second flute 12b via the sixth flank surfaces 14c1, which are positioned ahead of a corresponding one of the inner cutting edges 11a1, 11b1 in the rotational direction.

As illustrated in FIG. 1C and FIG. 3, an outer peripheral portion 16 (first outer peripheral portion 16a, second outer peripheral portion 16b) are areas without the flutes 12a, 12b. The diameter (outer diameter) of the drill in these areas is unchanged from the diameter before the formation of the flutes 12a, 12b. In other words, the outer peripheral portion 16 is a portion substantially corresponding to an outer end (outer periphery) of the cutting section 10 in a cross-sectional view and the outer peripheral portion 16 has an arc-like shape.

As illustrated in FIG. 3, the first outer peripheral portion 16a is continuous with the outer end 11ab of the first outer cutting edge 11a and extends toward the second flute 12b along the outer end in a front end view. Due to this configuration, during the drilling process, the first outer peripheral portion 16a guides the drill 1 while being in contact with the inner wall of the drilled hole in the work material.

In this embodiment, the first outer peripheral portion 16a includes, in the following order, a first margin 16a1, a first connection surface 16a2, and a first clearance 16a3, which is an order of distance from the first outer cutting edge 11a. The first margin 16a1 is a part of the outer end. The first connection surface 16a2 is curved toward the inner side in a front end view. The first flank surface 16a3 extends toward the second outer cutting edge 11b while retaining a predetermined depth from the outer end to the inner side. In this embodiment, the second outer peripheral portion 16b has a similar configuration and functions as the first outer peripheral portion 16a.

In the drill 1 of this embodiment, the outer diameter of the cutting section 10 may be within a range of 6 mm to 42.5 mm, for example. Furthermore, although not illustrated, in the drill 1 of this embodiment, a length of the axial line may be set to satisfy an equation L=3D to 12D in which L is a length of the axial line (length from the front end of the cutting section 10 to the end of the flutes 12a, 12b in a direction along the rotation axis O) and D is a diameter (outer diameter of the cutting section 10), for example.

<Method for Manufacturing Cut Workpiece>

Figure 5A:
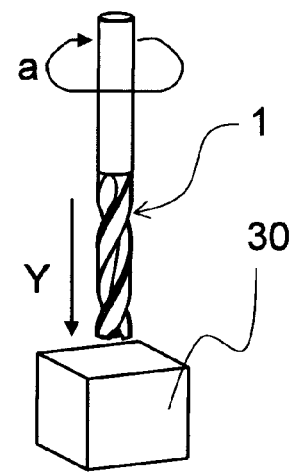
FIGS. 5A to 5C are views illustrating a method for manufacturing a cut workpiece according to an embodiment of the present invention.
Figure 5B:
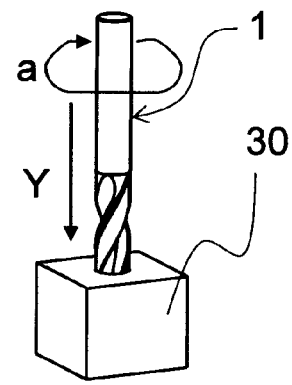
Figure 5C:
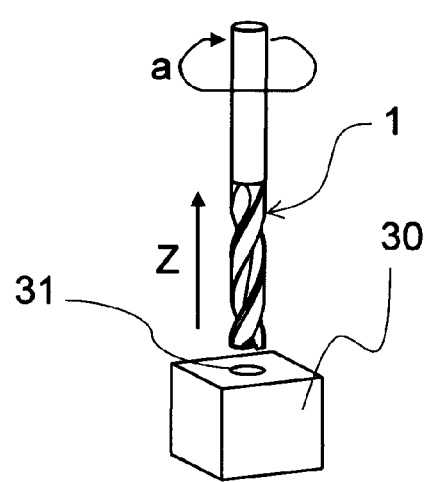

Next, a method for manufacturing a cut workpiece according to the present invention will be described in detail by using the drill 1 according to the above-described embodiment as an example. Hereinafter, the description is made with reference to FIG. 5. FIG. 5A is a view illustrating a step of moving the drill 1 closer to the work material 30 in a Y direction. FIG. 5B is a step of bringing the drill 1 into contact with the work material 30. FIG. 5C is a view illustrating a step of moving the drill 1 away from the work material 30 in a Z direction.

The method for manufacturing a cut workpiece according to this embodiment includes the following steps (i) to (iv).

In a step (i), the drill 1 is positioned over the prepared work material 30 (see FIG. 5A).

In a step (ii), the drill 1 is rotated about the rotation axis O in the direction indicated by an arrow "a" and the drill 1 is moved closer to the work material 30 in the direction indicated by an arrow "Y" (see FIGS. 5A and 5B).

This step may be performed by moving the rotating drill 1 closer to the work material 30 with the work material 30 being fixed onto the table of the machine including the drill 1, for example. In this step, the work material 30 and the drill 1 have only to come close to each other. The work material 30 may be moved closer to the drill 1 while the drill 1 is being fixed, for example.

In a step (iii), the drill 1 is further moved closer to the work material 30 such that the first cutting section 11A and the second cutting section 11B of the rotating drill 1 are brought into contact with a predetermined position of the surface of the work material 30. As a result, a drilled hole (through hole) 31 is formed in the work material 30 (see FIGS. 5B and 5C).

In this embodiment, in order to have a good finished surface, it is preferable that an area, which is positioned close to the rear end 10b, of the cutting section 10 of the drill 1, does not penetrate through the work material 30. In other words, this area is configured as a margin area for chip ejection to achieve a high chip ejection property.

In a step (iv), the drill 1 is moved in the direction indicated by an arrow "Z" so as to be away from the work material 30 (see FIG. 5C).

In this step, as in the above step (ii), the work material 30 and the drill 1 only have to be away from each other. The work material 30 may be moved away from the drill 1 while the drill 1 is fixed, for example.

Due to the above-described steps, good drilling performance is exhibited.

The above-described drilling process may be performed to the work material 30 multiple times, for example, to form a plurality of drilled holes (through holes) 31 in the work material 30. In such a case, a step of bringing the first outer cutting edge 11a and the second outer cutting edge 11b of the drill 1 into contact with the work material 30 may be repeated on different parts of the work material 30 while the drill 1 is being rotated.

Hereinabove, the drill 1 according to one embodiment of the present invention was described as an example. However, the present invention should not be limited to the above description, and may be implemented in any ways without departing from the spirit of the invention.

The shape of the cutting section 10, for example, should not be limited to the configuration in the above-described embodiment and may be any shape widely used by a person skilled in the art. The cutting section 10, for example, may have a tapered shape in which a web thickness in an inscribed circle increases from the front end portion 10a toward the rear end 10b. Furthermore, the cutting section 10 may be inclined such that the diameter of the drill (outer diameter) increases or decreases from the front end portion 10a toward the rear end 10b. Furthermore, the cutting section 10 may have a so-called undercut or a clearance.

Furthermore, in the above-described embodiment, the first flute 12a and the second flute 12b have the equal flute width. Alternatively, the first flute 12a and the second flute 12b each may have a larger flute diameter at a part in the front end portion 10a. With this configuration, a relatively large chip can be effectively ejected from the part of the flutes 12a, 12b in the front end portion 10a.

Furthermore, the first flute 12a and the second flute 12b may have a flute width that gradually increases or decreases from the front end portion 10a to the rear end 10b. In addition, the first flute 12a and the second flute 12b may be different in flute length. Furthermore, the helix angle of one or both of the first flute 12a and the second flute 12b may be changed such that the first flute 12a and the second flute 12b are connected.

Furthermore, in the drill 1 of the above-described embodiment, the first inner cutting edge 11a1 is away from the first outer cutting edge 11a, and the second inner cutting edge 11b1 is away from the second outer cutting edge 11b. Alternatively, the first inner cutting edge 11a1 may be continuous with the first outer cutting edge 11a, and the second inner cutting edge 11b1 may be continuous with the second outer cutting edge 11b.

Also in such a case, the operational advantages same as in the drill 1 of the above-described embodiment are obtained, because the first inner cutting edge 11a1 (first chisel edge 11a1) is positioned closer to the rear end 10b of the cutting section 10 than the inner end 11aa of the first outer cutting edge 11a, and the second inner cutting edge 11b1 (second chisel edge 11b1) is positioned closer to the rear end 10b of the cutting section 10 than the inner end 11ba of the second outer cutting edge 11b. Furthermore, the first cutting section 11A as a whole has high rigidity, because the first inner cutting edge 11a1 is continuous with the first outer cutting edge 11a.

In the above embodiment, the drill 1 including the cutting section 10 that is formed of a single member is described. Alternatively, a portion of the cutting section 10 including a front end may be detachable from a portion, of the cutting section 10, including the rear end 10b. Also in such a configuration, the same operational advantages as in the drill 1 of the above-described embodiments are obtained.

REFERENCE SIGNS LIST 1 drill
10 cutting section
10a front end portion
10b rear end
11A first cutting section
11a first outer cutting edge
11aa inner end
11ab outer end
11ac concave portion
11ad convex portion
11a1 first inner cutting edge (first chisel edge)
11a1a inner end
11a1b outer end
11B second cutting section
11b second outer cutting edge
11ba inner end
11bb outer end
11b1 second inner cutting edge (second chisel edge)
11b1a inner end
12a first flute
12b second flute
14 flank surface
14a first flank surface
14b second flank surface
14c third flank surface
14a1 fourth flank surface
14b1 fifth flank surface
14c1 sixth flank surface
16 outer peripheral portion
16a first outer peripheral portion
16a1 first margin
16a2 first connection surface
16a3 first clearance
16b second outer peripheral portion
20 body
30 work material
31 drilled hole (through hole)
O rotation axis (center axis)

The invention claimed is:

1. A drill comprising:
a cutting section having a cylindrical shape and configured to be rotated about a rotation axis, wherein the cutting section includes:
a first cutting section and a second cutting section at a front end portion thereof;
a first flute continuous with the first cutting section and extending helically around the rotation axis toward a rear end of the cutting section; and
a second flute continuous with the second cutting section and extending helically around the rotation axis toward the rear end of the cutting section, the first cutting section includes:
a first inner cutting edge continuous with the first flute and extending from the rotation axis toward an outer peripheral surface; and
a first outer cutting edge continuous with the first flute, positioned closer to the outer peripheral surface than the first inner cutting edge and gradually inclined to the rear end of the cutting section toward the outer peripheral surface,
the first inner cutting edge is offset from the first outer cutting edge in a front end view,
the second cutting section includes:
a second inner cutting edge extending from the rotation axis toward the outer peripheral surface; and
a second outer cutting edge positioned closer to the outer peripheral surface than the second inner cutting edge and gradually inclined to the rear end of the cutting section toward the outer peripheral surface,
a distance from the rear end of the cutting section to an inner end of the first outer cutting edge in a rotation axis direction is equal to a distance from the rear end of the cutting section to an inner end of the second outer cutting edge, and
the first inner cutting edge is positioned closer to the rear end of the cutting section than the inner end of the first outer cutting edge, and the second inner cutting edge is positioned closer to the rear end of the cutting section than the inner end of the second outer cutting edge.

2. The drill according to claim 1, wherein the first inner cutting edge is a first chisel edge.

3. The drill according to claim 2, wherein the first chisel edge has a curved shape in a front end view.

4. The drill according to claim 3, wherein the first chisel edge has a convex curved shape protruding toward the first flute in a front end view.

5. The drill according to claim 2, wherein an outer end of the first chisel edge is positioned behind an inner end of the first outer cutting edge in a rotational direction in a front end view.

6. The drill according to claim 2, wherein an outer end of the first outer cutting edge is positioned closer to the rear end than an inner end of the first chisel edge.

7. The drill according to claim 2, wherein the second inner cutting edge is a second chisel edge.

8. The drill according to claim 7, wherein the first chisel edge and the second chisel edge are smoothly continuous.

9. The drill according to claim 1, wherein the first cutting section and the second cutting section are point-symmetrical with respect to the rotation axis in a front end view.

10. A method for manufacturing a cut workpiece, the method comprising:
rotating about the rotation axis the drill according to claim 1;
bringing the first cutting section and the second cutting section of the drill into contact with a work material while the drill is being rotated; and
moving the drill away from the work material.

11. The drill according to claim 1, wherein the first outer cutting edge comprises a first part including the inner end of the first outer cutting edge and inclined rearward in a rotational direction as a distance from the inner end of the first outer cutting edge;

a second part positioned closer to the outer peripheral surface than the first part and inclined forward in a rotational direction as a distance from the first part; and a third part positioned closer to the outer peripheral surface than the second part and inclined rearward in a rotational direction as a distance from the second part.

12. The drill according to claim 1, wherein, in the front end view, the first outer cutting edge comprises a concave portion recessed from the first flute; and a convex portion protruding toward the first flute and positioned closer to the outer peripheral portion than the concave portion; and an apex of the convex portion is away from the outer peripheral portion.

13. The drill according to claim 1, wherein the inner end of the first outer cutting edge is positioned closer to the rotation axis than an outer end of the first inner cutting edge.

14. The drill according to claim 1, wherein the offset is at least one of an offset in a rotational direction or a radial offset.

* * * * *